(12) United States Patent
Nefzger et al.

(10) Patent No.: US 11,926,701 B2
(45) Date of Patent: Mar. 12, 2024

(54) POLYCARBONATE POLYOLS, POLYISOCYANATE PREPOLYMERS AND POLYURETHANE AND POLYURETHANE UREA ELASTOMERS BASED THEREON

(71) Applicant: Covestro Deutschland AG, Leverkusen (DE)

(72) Inventors: Hartmut Nefzger, Pulheim (DE); Harald Knaup, Neuss (DE); Hans-Peter Huber, Cologne (DE); Andreas Stumpf, Palm Jumeirah (AE); Stephan Reiter, Langenfeld (DE)

(73) Assignee: Covestro Deutschland AG, Leverkusen (DE)

( * ) Notice: Subject to any disclaimer, the term of this patent is extended or adjusted under 35 U.S.C. 154(b) by 937 days.

(21) Appl. No.: 16/956,545

(22) PCT Filed: Dec. 12, 2018

(86) PCT No.: PCT/EP2018/084517
§ 371 (c)(1),
(2) Date: Jun. 19, 2020

(87) PCT Pub. No.: WO2019/121218
PCT Pub. Date: Jun. 27, 2019

(65) Prior Publication Data
US 2023/0098913 A1     Mar. 30, 2023

(30) Foreign Application Priority Data

Dec. 19, 2017 (EP) ..................................... 17208595

(51) Int. Cl.
*C08G 18/10* (2006.01)
*C08G 18/44* (2006.01)
*C08G 64/30* (2006.01)

(52) U.S. Cl.
CPC ........... *C08G 64/305* (2013.01); *C08G 18/10* (2013.01); *C08G 18/44* (2013.01)

(58) Field of Classification Search
None
See application file for complete search history.

(56) References Cited

U.S. PATENT DOCUMENTS

| 3,900,688 | A | 8/1975 | Thoma et al. |
| 4,456,745 | A | 6/1984 | Rajan |
| 4,463,141 | A | 7/1984 | Robinson |
| 4,476,293 | A | 10/1984 | Robinson |
| 5,061,426 | A | 10/1991 | Frauendorf et al. |
| 5,100,999 | A * | 3/1992 | Murai ................ C08G 64/0208 528/80 |
| 5,795,952 | A | 8/1998 | Greco |
| 6,323,299 | B1 * | 11/2001 | Handlin ............. C08G 18/6208 528/65 |
| 2001/0047073 | A1 | 11/2001 | Mizia et al. |
| 2007/0166552 | A1 * | 7/2007 | Hofacker ................ C08G 18/10 428/423.1 |
| 2009/0018256 | A1 | 1/2009 | Nefzger et al. |
| 2014/0107245 | A1 | 4/2014 | Hofmann et al. |
| 2014/0221602 | A1 | 8/2014 | Müller et al. |
| 2016/0362518 | A1 | 12/2016 | Muller et al. |
| 2018/0171060 | A1 * | 6/2018 | Boghossian ........... C08G 18/44 |
| 2023/0098913 | A1 * | 3/2023 | Nefzger ................ C08G 18/10 528/44 |

FOREIGN PATENT DOCUMENTS

| DE | 2252280 A1 | 5/1974 |
| DE | 2619831 A1 | 11/1977 |
| DE | 3717060 A1 | 12/1988 |
| DE | 102006002154 A1 | 7/2007 |
| EP | 0421217 A2 | 4/1991 |
| EP | 1477508 A1 | 11/2004 |
| WO | 2004/101640 A1 | 11/2004 |

OTHER PUBLICATIONS

International Preliminary Report on Patentability received for PCT Patent Application No. PCT/EP2018/084517, dated Jul. 2, 2020, 15 pages (9 pages of English Translation and 6 pages of Original Document).
International Search Report and Written Opinion received for PCT Patent Application No. PCT/EP2018/084517, dated Mar. 7, 2019, 17 pages (8 pages of English Translation and 9 pages of Original Document).
Kricheldorf et al., "Controlled Degradation and In-Situ Functionalization of Polycarbonates by Means of Bu2SnO", Macromol. Rapid Commun., Dec. 31, 2001, pp. 750-755.

* cited by examiner

*Primary Examiner* — Robert S Loewe
(74) *Attorney, Agent, or Firm* — The Webb Law Firm

(57) ABSTRACT

The present invention relates to novel high-value polycarbonate polyols, to processes for the production thereof, to polyisocyanate prepolymers obtainable therefrom and also polyurethane (PUR) and polyurethane urea elastomers which under particularly demanding applications show unique combinations of processing characteristics, hydrolysis and oxidation stability, mechanical and dynamic mechanical properties.

15 Claims, No Drawings

POLYCARBONATE POLYOLS, POLYISOCYANATE PREPOLYMERS AND POLYURETHANE AND POLYURETHANE UREA ELASTOMERS BASED THEREON

CROSS-REFERENCE TO RELATED APPLICATIONS

This application is a national stage application (under 35 U.S.C. § 371) of PCT/EP2018/084517, filed Dec. 12, 2018, which claims benefit of European Application No. 17208595.3, filed Dec. 19, 2017, both of which are incorporated herein by reference in their entirety.

The present invention relates to new, high-grade polycarbonate polyols, to processes for preparing them, to polyisocyanate prepolymers obtainable therefrom, and also to polyurethane (PU) and polyurethaneurea elastomers, which in particularly demanding applications exhibit unique combinations of processing characteristics, hydrolysis and oxidation stability, and mechanical and dynamomechanical properties.

Polyurethane elastomers were first commercialized more than 60 years ago under the Vulkollan® trade name, based on 1,5-naphthalene diisocyanate (NDI; Desmodur® 15 from Covestro Deutschland AG), a long-chain polyester polyol and a short-chain alkanediol.

Long-chain polyols employed, aside from polyester polyols, are also polyether polyols, polycarbonate polyols and polyetherester polyols. The choice of long-chain polyol is guided mainly by the requirements of the respective application. In this connection, reference is also made to "tailored properties". For example, polyether polyols are used when hydrolysis stability and low-temperature properties are important. For polyester polyols, advantages arise over polyether polyols with regard to mechanical properties and UV stability. However, one disadvantage is low microbe resistance, for example. Polycarbonate polyols in a certain way combine the advantages of polyether and polyester polyols, but are relatively expensive by comparison with the latter.

The advantages of polycarbonate polyols lie particularly in their UV stability, hydrolysis stability, and their mechanical properties.

A disadvantage of polyester polyols and polycarbonate polyols and of their blend products, the polyestercarbonate polyols, with respect to the polyether polyols is that their low-temperature characteristics are usually less advantageous. This is for structural reasons and arises from the elevated polarity of the carbonyl groups, the effect of which is normally that polyester polyols and polycarbonate polyols are semicrystalline, whereas polyether polyols, especially the propylene oxide-based types, the major group in commercial terms, are amorphous. With the known empirical rule of Beaman and Bayer (M. D. Lechner, K. Gehrke and E. H. Nordmeier, Makromolekulare Chemie, Birkhäuser Verlag 1993, p. 327)

$$T_g = \tfrac{2}{3} T_m \qquad (I)$$

the relationship between the glass transition temperature, ($T_g$) and the melting temperature, ($T_m$,) for semicrystalline systems is made clear. Where, for example, polycarbonate polyols have melting temperatures of the semicrystalline fractions of around 70° C. (343 K), the glass transition temperatures of the amorphous regions are of the order of −43° C. (230 K). These values largely apply even when the polycarbonate polyols are present in incorporated form as soft segment polyols in segmented multiblock copolyurethanes, e.g., in the form of thermoplastic polyurethane elastomers (TPU) or polyurethane casting elastomers. From this it becomes clear that it is desirable to provide polycarbonate polyols having an extremely low melting range. On the one hand, this facilitates processing, and on the other hand the service temperature range is extended toward lower temperatures, as a consequence of the glass transition temperature, which is then likewise lowered.

The service temperature range is limited at the upper end by the thermal characteristics of the hard segments (e.g., urethane, urea, isocyanurate groups etc.), i.e., of the structural elements originating from the polyisocyanate units.

A disadvantage of using 1,6-hexanediol as a diol component for, for example, polycarbonate or polyadipate polyols of the kind used in polyurethane chemistry is the increased viscosity and the comparatively high melting point for parameters that are otherwise identical (molecular weight and functionality).

There has been no lack of attempts to modify the melting range of the polycarbonate polyol most technically important for polyurethane elastomers, namely hexanediol polycarbonate polyol, in such a way that it is possible to model specific requirements of as many applications as possible. In DE-A 3717060, for example, hexanediol is replaced partly, for example, by hexanediol ether units, with the consequence of a crystalline fraction which is reduced relative to pure hexanediol polycarbonate polyol, and of a melting range which is shifted toward lower temperatures. A disadvantage of this method, however, is that these hexanediol ether units can only be prepared at great effort and complexity, meaning that important applications are not economically accessible.

H. Tanaka and M. Kunimura (Polymer Engineering and Science, Vol. 42, No. 6, p. 1333, (2002)) point out a path which eliminates at least the aforesaid disadvantage, by preparing copolycarbonate polyols from 1,6-hexanediol and 1,12-dodecanediol, these polyols having melting temperatures which are a significant reduction on their homopolycarbonate polyols. With the measurement methodology used, they determined the melting point of hexanediol polycarbonate polyol at 47.4° C. and that of 1,12-dodecane polycarbonate polyol at 65.5° C., whereas a copolycarbonate polyol with a composition of 70 parts by weight hexanediol: 30 parts by weight 1,12-dodecanediol melts at 29.1° C., representing a reduction in the melting range by 18.3° C. and 36.3° C., respectively, on the homopolymers. A similar behavior is shown by the heats of fusion [J/g] which have a minimum when the polycarbonate polyol is made from 70 parts of hexanediol and 30 parts of 1,12-dodecanediol.

In spite of these approaches which are highly promising in principle, and which incidentally have also been applied to thermoplastic polyurethane elastomers synthesized from them, this pathway has to date not been implemented technically, or at least not to any notable extent.

A key reason for this is that 1,12-dodecanediol in particular has such an unfavorable pricing that the resultant price of the polycarbonate polyol or copolycarbonate polyol and hence ultimately of the polyurethane elastomer becomes so high that it outweighs the advantages which may accrue from the complete or partial use of 1,12-dodecanediol.

This means that the cost of any technical advantages there might be would be too high.

It was an object of the present application, therefore, to provide new polycarbonate polyols as building blocks for polyurethanes, especially polyurethane casting elastomers and/or thermoplastic polyurethanes, the starting compounds of which are readily accessible and widely available commercially and which at the same time exhibit hydrolysis stability and advantageous low-temperature properties and also the very same mechanical properties and UV stability.

It is an object of the invention, additionally, to provide new polyurethanes which do not have the aforesaid disadvantages such as limited availability and poor profitability, and which are based in particular on the new polycarbonate polyols.

A subject of the invention, therefore, are polycarbonate polyols having an OH number of 40 to 80 mg KOH/g and a mean functionality of 1.9 to 2.2, comprising the reaction product of
A) at least one α,ω-alkanediol having 4 to 8 carbon atoms and
B) at least one polytetrahydrofuran, and optionally
C) diethylene glycol
with at least one
D) carbonyl component selected from the group consisting of diaryl carbonates, dialkyl carbonates, cyclic alkylene carbonates and $COCl_2$, preferably diphenyl carbonate, and/or mixtures thereof.

The molar mass of the polycarbonate polyol in the invention is in the range from 1200 to 2500 Da. The viscosity of the polycarbonate polyols as measured at 75° C. is between 500 and 5000 mPas, preferably between 1000 and 3500, and more preferably between 1500 and 3000 mPas. The mean functionality is in the range from 1.9 to 2.2. This is achieved by additionally adding monools or polyols where appropriate. Examples of polyols in this context are 1,1,1-trimethylolpropane, and of monools 1-octanol. Functionalities below 2 can also be obtained by incomplete reaction of the dialkyl and diaryl carbonates used, thus forming alkylcarbonato and arylcarbonato end groups, respectively.

In one embodiment of the invention, the at least one α, ω-alkanediol having 4 to 8 carbon atoms (A) is selected from the group consisting of 1,4-butanediol, 2-methylpropane-1,3-diol, 1,5-pentanediol, 3-methylpentane-1,5-diol, 1,6-hexanediol and 1,8-octanediol, preferably 1.6-hexanediol, and/or mixtures thereof.

In a further embodiment of the invention, the at least one polytetrahydrofuran (B) has number-average molecular weights in the range from 250 to 2900 Da, preferably 600 to 2500, more preferably from 650 to 2000.

In another embodiment of the invention, the molar ratio of carbonate groups to ether groups is in the range from 0.2:1 to 3.5:1, preferably in the range from 0.3:1 to 3:1, more preferably in the range from 0.4:1 to 2.8:1.

In a further embodiment of the invention, the maximum in a melting endotherm determined by DSC at a heating rate of 10° C./min for a sample stored at room temperature for more than four weeks is in the range from 9 to 59° C., preferably 10-50° C.

As has emerged in practice, however, the reaction of the components A), B) and optionally C) with diphenyl carbonate as carbonyl component D) cannot take place by the processes known to the skilled person. Normally, all of the reactants would be jointly introduced and, by means of the aliphatic hydroxyl groups, the alcohol component would be released and distilled from the corresponding carbonate, for example phenol from diphenyl carbonate, or HCl from phosgene.

Disadvantageously, however, it has emerged that in the presence of all components in one batch, the polycondensation reaction is disrupted to a considerable extent, meaning that in the present example, the elimination of phenol from diphenyl carbonate comes to a standstill at an early point in time. As a result, the target molar mass of the polycarbonate polyol falls far short of being achieved; furthermore, such products have end groups which are not NCO-reactive, examples thus being phenoxy carbonate and phenyl carbonate end groups. Products of these kinds, of course, are entirely unserviceable and therefore valueless as raw materials for the preparation of polyurethanes.

A further object of the present invention, therefore, was to provide a process that provides access to the polycarbonate polyols of the invention for the first time, reliably, and extremely simply.

Surprisingly it has been found that a later addition of component B) overcomes the disadvantages stated above.

A further subject of the present invention is therefore a process for preparing polycarbonate polyols, characterized in that a two-stage process is used, wherein
  in a first stage, in the presence of a catalyst, an intermediate is prepared from
  A) at least one α,ω-alkanediol having 4 to 8 carbon atoms,
  C) optionally diethylene glycol, and
  D) at least one carbonyl component from the group consisting of diaryl carbonates, dialkyl carbonates, alkylene carbonates and $COCl_2$, more preferably diphenyl carbonate, and/or mixtures thereof,
  and in a second stage this intermediate is reacted with
  B) at least one polytetrahydrofuran.

In practice there may be deviations between theoretically calculated and experimentally determined hydroxyl numbers for the intermediate; the experimentally determined hydroxyl number is in practice usually 3 to 10 OHN units below that expected theoretically, although in certain cases may even be more than 10 OHN units below it, the reason being that, on the distillative removal of the low molecular mass reaction product eliminated, for example the phenol when using diphenyl carbonate as carbonyl source, there may be losses of A) α, ω-alkanediols having 4 to 8 carbon atoms and where relevant C) diethylene glycol. These losses can be compensated either by determining this loss in preliminary tests and accordingly deploying more of the substances A) α, ω-alkanediols having 4 to 8 carbon atoms and where relevant C) diethylene glycol, i.e., calculating a higher hydroxyl number than actually desired, or else by compensating the experimentally found hydroxyl number of the intermediate, which is too low, by adding in stage 2, in the context of the second reaction stage, the losses of A) and/or C) occurring in the first stage, and reacting these together with B) polytetrahydrofuran.

A further subject of the present invention is therefore a process for preparing polycarbonate polyols as described, where, in the second stage, in addition to the
  B) at least one polytetrahydrofuran
  for compensating the diols A) and/or C) partially removed in the first stage,
  A) at least one α, ω-alkanediol having 4 to 8 carbon atoms and/or
  C) diethylene glycol
  are/is added.

A further subject of the invention is a process for preparing polycarbonate polyols as described, wherein
  in the first stage, components A) and/or C) are used in excess in an amount which produces a deviation of 2 to 20 hydroxyl number units relative to the actual target hydroxyl number.

In one embodiment of the inventive process, the catalyst is a basic catalyst. After the end of the second stage, the catalyst may be neutralized using a Broenstedt acid.

In a further embodiment of the inventive process, the reaction in both stages takes place at temperatures in the range from 100° C. to 225° C., preferably 160° C. to 210° C.

Catalysts for the process of the invention are, for example, basic catalysts such as magnesium hydroxide carbonate pentahydrate, or else oxides, hydroxides, alkoxides, carboxylates and phenoxides of alkali metals and alkaline earth metals.

Examples of Broenstedt acids are hydrochloric acid, organomineral acids, e.g., dibutyl phosphate, and also adipic acid, malic acid, succinic acid, pyruvic acid or citric acid.

The polycarbonate polyols of the invention can be subsequently processed further into polyurethane materials (PU), preferably via a prepolymer stage, by reacting the polycarbonate polyols of the invention, optionally with the accompanying use of short-chain organic compounds having hydroxyl and/or amino end groups and/or water, with polyisocyanates, preferably diisocyanates.

A further subject of the invention, accordingly, are NCO prepolymers based on or comprising the polycarbonate polyols of the invention as a constitutional unit. Especially in accordance with the invention NCO prepolymers having an NCO content of 3 to 15 wt % are obtainable by reacting polycarbonate polyols of the invention and at least one polyisocyanate from the group consisting of 1,5-naphthalene diisocyanate, 2,4'-diphenylmethane diisocyanate (2,4'-MDI), 4,4'-diphenylmethane diisocyanate (4,4'-MDI), or mixtures thereof, mixtures of 2,4'- and 4,4'-MDI, and also carbodiimide-/uretonimine-modified MDI derivatives, and higher polycyclic homologs of the diphenylmethane series, diisocyanatotoluenes, hexamethylene diisocyanate, isophorone diisocyanate or mixtures thereof, in a molar excess, preferably in a ratio of NCO to OH groups of 1.8:1 to 10:1, preferably 2.0:1 to 5:1, more preferably 2.1:1 to 3:1.

A further subject of the invention are polyurethane elastomers and polyurethaneurea elastomers based on or comprising the NCO prepolymers of the invention.

Especially in accordance with the invention are polyurethane elastomers or polyurethaneurea elastomers obtainable by reacting NCO prepolymers of the invention with (i) at least one aliphatic diol having primary hydroxyl groups and number-average molecular weight of 62 to 202 and in amounts of 0-10 wt %, based on the at least one aliphatic diol, compounds from the group consisting of short-chain polyols having functionalities >2 to 4 and higher molecular weight polyols having a functionality of 2, and polycarbonate polyols of the invention, or (ii) at least one aromatic diaminic chain extender from the group consisting of 4,4'-methylenebis(2-chloroaniline) (MBOCA), 3,3', 5,5'-tetraisopropyl-4,4'-diaminodiphenylmethane, 3,5-dimethyl-3', 5'-diisopropyl-4,4'-diaminophenylmethane, 3,5-diethyl-2,4-tolylenediamine, 3,5-diethyl-2,6-tolylenediamine (DETDA), 4,4'-methylenebis(3-chloro-2,6-diethylaniline), 3,5-dimethylthio-2,4-tolylenediamine, 3,5-dimethylthio-2,6-tolylenediamine, isobutyl 3,5-diamino-4-chlorobenzoate, or mixtures thereof, in the presence of optionally water and optionally further auxiliaries and adjuvants.

Preferred for use as aliphatic diols are butanediol, hexanediol, 1,4-cyclohexanediol, 2,2'-thiodiethanol or mixtures thereof.

When water is used as chain extender and/or as blowing agent, the polyurethane elastomers preferably having densities of 0.3 to 0.95 g/cm$^3$, preferably 0.5 to 0.9.

The polyurethane elastomers and the polyurethaneurea elastomers are produced preferably by the casting method, where a distinction is made essentially between two processes: First, the NCO prepolymer process, in which long-chain polyol and stochiometrically excess polyisocyanate are reacted to form a prepolymer containing NCO groups, followed by chain extension with a short-chain organic compound having hydroxyl or amino end groups and/or water. Secondly, polyurethane casting elastomers may also be prepared by the one-shot process, where long-chain polyol and short-chain organic compounds having hydroxyl or amino end groups and/or water are mixed and then reacted with polyisocyanate.

From the polycarbonate polyols of the invention it is possible to prepare not only polyurethane casting elastomers but also thermoplastically processable polyurethane elastomers by the processes known to the skilled person.

In addition to the components used in the invention, it is possible when producing the polyurethane elastomers or polyurethaneurea elastomers to employ the customary catalysts and auxiliaries.

Examples of catalysts are trialkylamines, diazabicyclooctane, tin dioctoate, dibutyltin dilaurate, N-alkylmorpholine, lead, zinc, calcium and magnesium octoates, the corresponding naphthenates, and p-nitrophenolate.

Examples of stabilizers are Broenstedt and Lewis acids, e.g., hydrochloric acid, benzoyl chloride, organomineral acids, e.g. dibutyl phosphate, and also adipic acid, malic acid, succinic acid, pyruvic acid or citric acid.

Examples of UV inhibitors and hydrolysis inhibitors are, for example, 2,6-dibutyl-4-methylphenol and carbodiimides.

Incorporable dyes, which can likewise be used, are those which possess Zerewitinoff-active hydrogen atoms which are able to be reacted with NCO groups.

Zerewitinoff-active hydrogen atoms are those which, bonded to nitrogen, oxygen or sulfur, are active, i.e., can be removed as a proton with comparative ease, and have a certain acidity. Zerewitinoff-active hydrogen atoms of carboxyl, hydroxyl, amino and imino and also thiol groups can be determined by a method discovered by T. Zerewitinoff (Zerewitinoff reaction, Zerewitinoff determination) for ascertaining the constitution of organic compounds. Reaction of the acidic compound with methylmagnesium iodide in butyl ethers or other ethers (Zerewitinoff s reagent, equation, e.g., $ROH+CH_3MgI \rightarrow ROMgI+CH_4$) enables the determination of the number of active hydrogen atoms, by gas-volumetric measurement of the resultant methane (one equivalent per active hydrogen atom). The active hydrogen of C—H-acidic compounds as well (carbonyl compounds, nitriles, alkynes, nitro compounds, sulfones) can in certain cases be quantitatively detected in this way.

Further auxiliaries and adjuvants comprise emulsifiers, foam stabilizers, cell regulators, and fillers. An overview is given in G. Oertel, Polyurethane Handbook, $2^{nd}$ edition, Carl Hanser Verlag, Munich, 1994, Ch. 3.4.

The use of the polyurethane elastomers of the invention is in the field of technical components, and is therefore extremely diverse, encompassing, for example, roll coatings, shoe press blankets in the paper industry, pigs, pig disks, seals, pipe coatings in the oil and gas industry, stiffening elements for pipes and cables in the offshore industry, conveyor belts and screens in the mining sector, and also doctor blades, wheels, rollers, or potting compound.

Likewise a subject of the invention, therefore, are technical components, roll coatings, shoe press blankets, electrical castings, pigs, pig disks, seals, pipe coatings, stiffening elements for pipes or cables, doctor blades, wheels, rollers, conveyor belts or screens, comprising the polyurethane and polyurethaneurea elastomers of the invention.

The invention is to be illustrated in detail by the examples which follow.

EXPERIMENTAL SECTION

Raw Materials

| | |
|---|---|
| Diphenyl carbonate | Lanxess AG |
| Hexanediol | BASF SE |
| Diethylene glycol | Ineos GmbH |
| Polytetrahydrofuran 650 | OHN 174.7 mg KOH/g from Sigma-Aldrich |
| Polytetrahydrofuran 1000 | OHN 113.7 mg KOH/g from Invista, |
| Polytetrahydrofuran 2000 | OHN 55.8 mg KOH/g from BASF SE |
| Dibutyl phosphate | Fluka |
| TEG | Tetraethylene glycol from Sigma Aldrich |

Magnesium hydroxide carbonate pentahydrate Merck

Desmodur® 0118 T Monomeric diphenylmethane 4,4'-diisocyanate (MDI) having a molecular weight of 250 g/mol and an NCO content of 33.6 wt % NCO, from Covestro Deutschland AG Baytec C2208 Polycarbonate polyol without ether groups, from Covestro Deutschland AG, having a hydroxyl number of around 56 mg KOH/g, a functionality of 2 and a viscosity of 1600 mPas (75° C.).

Butanediol: 1,4-Butanediol from Sigma Aldrich

Baytec XL B: Standard crosslinker from Covestro Deutschland AG for the production of hot-casting and cold-casting polyurethane elastomers, having a hydroxyl number of around 1245 mg KOH/g and a melting point of around 19.5° C.

Baytec XL TR: Crosslinker from Covestro Deutschland AG for producing hot-casting and cold-casting polyurethane elastomers, present as colorless flakes at room temperature, which melt above 60° C. to give a likewise colorless liquid. The hydroxyl number—OH number—is around 1254 mg KOH/g.

Baytec VP.PU 0385: Polycarbonate polyol containing ether groups, from Covestro Deutschland AG, having a hydroxyl number of 56 mg KOH/g and a functionality of 2.

Analytical Methods

Hydroxyl number: The OH number was determined according to the method of DIN 53240-1 (method without catalyst, June 2013 version).

Amine number: Total base number according to DIN 51639-1, in the November 2014 version.

Acid numbers were determined according to DIN EN ISO 2114 (June 2002).

Viscosity: Dynamic viscosity: MCR 51 rheometer from Anton Paar in accordance with DIN 53019-1 (September 2008 version) using a CP 50-1 measuring cone, diameter 50 mm, angle 1° at shear rates of 25, 100, 200 and 500 s$^{-1}$. The polyols of the invention and those not of the invention display viscosity values that are independent of the shear rate.

For the photometric determination of aromatic end groups (phenoxy carbonate and phenyl carbonate) and also of free phenol in polycarbonate polyols, a Perkin Elmer Lambda 25 UV/Vis spectrometer was used.

DSC max: DIN EN ISO 11357-1, March 2010 version. Peak maximum (endotherm) reported in ° C. from a heating curve from −40° C. to +100° C., heating rate 10° C./min, determined using a TA Waters Q20 DSC instrument, the sample having been stored at room temperature for more than four weeks prior to measurement.

Shore hardness: DIN ISO 7619-1; February 2012 version

100% modulus, 300% modulus, stress at yield and elongation at break: DIN 53504 (version of Oct. 1, 2009)

Tear strength: ISO 34-1 (version of Sep. 1, 2016). Angular specimens were used

Rebound resilience: DIN 53512 (version of Apr. 1, 2000)

Abrasion DIN ISO 4649 (version of March 2014)

Density DIN EN ISO 1183-1 (version of April 2014)

CS—compression set, 22 h 70° C. according to ISO 815-1 (version of Sep. 1, 2016)

Glass transition temperature, dynamic mechanical analysis, DMA:

The glass transition temperature was determined by dynamic mechanical analysis (DMA) in accordance with the instrument manufacturer protocol, the instrument used being a TA Instruments DMA 2980 and the measurement taking place in single cantilever mode (date/version not apparent from the operating instructions). The glass transition temperature reported is the temperature at which the tan δ plot exhibits a maximum. In this case, the sample was equilibrated at −80° C. and then heated up to a maximum of 230° C. with a heating rate of 3° C./min, at an amplitude of 100 μm and a frequency of 1 Hz. Index: This refers to the product of multiplying 100 by the molar ratio of NCO groups to NCO-reactive groups in a formulation Casting time: The time from the end of stirred incorporation of the crosslinker until a marked increase in the viscosity of the reaction material. If the casting time is exceeded, the reacting melt can no longer be cast without the consequences of quality detractions, such as air inclusions, poor visual surface quality, through to deficient physical properties in the finished component.

Lifting time: The time required by a reaction material, cast onto a hot surface (110° C.), to be able to be lifted from this surface while retaining dimensional stability.

Table temperature: Temperature of the casting table, 110° C.

Mold temperature: Temperature of the mold, 110° C.

Demolding time: The time needed in order to be able to demold a test specimen, cast with a mold temperature of 110° C., with dimensional stability and absence of tack.

In the case of NDI-based formulations, the test specimens immediately after demolding are thermally aftertreated for 24 h at 110° C. in a forced air drying cabinet. Prior to the determination of the mechanical properties, the test specimens are stored for four weeks at room temperature and around 50% relative humidity.

WORKING EXAMPLES

1.) Synthesis of the Polycarbonate Polyols, Two-Stage Process (Inventive)

The inventive examples A-1 to A-5 were prepared according to the following process:

Example A-1: Polycarbonate Polyol From Polytetrahydrofuran, Diethylene Glycol and Hexanediol A distillation apparatus consisting of a 10 liter four-neck flask, heating jacket, thermal sensor, ground-glass-joint adapter for introduction of nitrogen, stirrer, column, heated (45° C.) distillation bridge, heated (45° C.) descending Claisen condenser with heated (45° C.) tap, two-neck flask as receiver, thermometer for overhead temperature, membrane pump and oil pump was charged with 4386.9 g (20.38 mol) of diphenyl carbonate, 2054 g (17.35 mol) of hexanediol, 474 g (4.47 mol) of diethylene glycol and 122 mg of magnesium hydroxide carbonate pentahydrate, and this initial charge was heated slowly to 180° C. with stirring and with N2 blanketing. Stirring was carried out at 180° C. for 2 hours under standard pressure, after which the batch was cooled to 110° C. and reduced pressure was applied. When the pressure reached 15 mbar, phenol was distilled off, the overhead temperature being not more than 80° C.

When the distillation of phenol slowed down, the liquid-phase temperature was raised to eventually 200° C. in small steps. Under these reaction conditions, the reaction was completed over the course of one hour.

The pressure was subsequently reduced to around 0.5 to 1 mbar in order to remove remnants of phenol. The final mass of phenol was 3848 g (theoretical 3850 g). After cooling had taken place to around 80° C., a sample was taken for the purpose of determining the OH number and the end groups:

OH number: 46.3 mg KOH/g
End groups: phenyl carbonate end groups 0.07 wt %, phenol and phenoxy end groups: not detectable The mass of the resultant intermediate was found to be 3007 g, and 506 g of polytetrahydrofuran 1000 (OH number 113.7 mg KOH/g) were added. Heating took place under $N_2$ blanketing and with stirring at 200° C. for six hours. After cooling had taken place to around 80° C., a sample was taken for the purpose of determining the OH number and the viscosity. This was followed by neutralization, at 80° C., by the stirred incorporation of 720 mg of dibutyl phosphate.

OH number: 57.8 mg KOH/g
Viscosity: 2200 mPas (75° C.)

2.) Synthesis of the Polycarbonate Polyols, One-Stage Process (Not Inventive)

The noninventive examples A-6 and A-7 were prepared by the following method:

Example A-6: Polycarbonate Polyol From Polytetrahydrofuran 1000, Diethylene Glycol and Hexanediol A distillation apparatus consisting of a 10 liter four-neck flask, heating jacket, thermal sensor, ground-glass-joint adapter for introduction of nitrogen, stirrer, column, heated (45° C.) distillation bridge, heated (45° C.) descending Claisen condenser with heated (45° C.) tap, two-neck flask as receiver, thermometer for overhead temperature, membrane pump and oil pump was charged with 4214 g (19.67 mol) of diphenyl carbonate, 2436.6 g (20.76 mol) of hexanediol, 1044.3 g (1.05 mol) of polytetrahydrofuran 1000 and 160 mg of magnesium hydroxide carbonate pentahydrate, and this initial charge was heated slowly to 180° C. with stirring and with $N_2$ blanketing. The batch was stirred at 180° C. for two hours under standard pressure, after which it was cooled to 110° C. and reduced pressure was applied. Since, on reaching 15 mbar, no phenol was distilled off (in contrast to the inventive examples), the temperature was raised in steps, with a slight onset of phenol distillation at a liquid-phase temperature of 145° C., but with a rapid climb in the overhead temperature to 110° C. and the distillative removal not of phenol but of hexanediol (in contrast to the inventive examples).

Repeated lowering of the liquid-phase temperature to 140° C. did bring an end to the unwanted distillation of the hexanediol, but did not result in the reformation of further phenol—that is, when the liquid-phase temperature was raised, the overhead temperature climbed repeatedly to 110° C. The batch was discarded.

3.) Synthesis of the Polycarbonate Polyols, One-Stage Process (Not Inventive)

The noninventive examples. A-8 and A-9 were prepared by the following process:

Example A-8: Polycarbonate Polyol From Diethylene Glycol and Hexanediol

A distillation apparatus consisting of a 6 liter four-neck flask, heating jacket, thermal sensor, ground-glass-joint adapter for introduction of nitrogen, stirrer, column, heated (45° C.) distillation bridge, heated (45° C.) descending Claisen condenser with heated (45° C.) tap, two-neck flask as receiver, thermometer for overhead temperature, membrane pump and oil pump was charged with 2865.1 g (13.38 mol) of diphenyl carbonate, 1181 g (10.06 mol) of hexanediol, 468.6 g (4.42 mol) of diethylene glycol and 80 mg of magnesium hydroxide carbonate pentahydrate, and this initial charge was heated slowly to 180° C. with stirring and with $N_2$ blanketing. The batch was stirred at 180° C. for two hours under standard pressure, and then cooled to 110° C., and reduced pressure was applied.

When 15 mbar had been reached, phenol was distilled off, with the overhead temperature being not more than 80° C.

When the distillation of phenol slowed down, the liquid-phase temperature was raised to an eventual 200° C. in small steps. Under these reaction conditions, the reaction was completed over one hour.

The pressure was subsequently reduced to around 0.1 to 0.5 mbar in order to remove remnants of phenol. The final mass of phenol was 2517 g (theoretical 2515 g). After cooling had taken place to around 80° C., a sample was taken for the purpose of determining the OH number and the end groups. This was followed by neutralization, by stirred incorporation of 470 mg of dibutyl phosphate at 80° C.

OH number: 48.4 mg KOH/g
End groups: phenyl carbonate end groups 0.02 wt %, phenol 0.01 wt % and phenoxy end groups 0.04 wt %.
Viscosity: 4480 mPas (75° C.)

TABLE 1

Formulations and analytical data of inventive and noninventive polycarbonate polyols

| | | Example | | | | | | | | |
|---|---|---|---|---|---|---|---|---|---|---|
| | | A-1, inv. | A-2, inv. | A-3, inv. | A-4, inv. | A-5, inv. | A-6, comp. | A-7, comp. | A-8, comp. | A-9, comp. |
| Formulation: | | | | | | | | | | |
| Diphenyl carbonate | [g] | 4386.9 | 4362.7 | 4150.2 | 3031.0 | 4307.0 | 4214.2 | 4319.0 | 2865.1 | 2533.7 |
| Hexane-1,6-diol | [g] | 2054.0 | 2562.7 | 2479.6 | 1814.0 | 1910.3 | 2436.6 | 2427.6 | 1181.0 | 1255.7 |
| Polytetrahydrofuran 650 | [g] | — | — | — | — | — | — | 1040.4 | — | — |
| Polytetrahydrofuran 1000 | [g] | 506 | 540 | — | — | 930.0 | 1044.3 | — | — | — |

TABLE 1-continued

Formulations and analytical data of inventive and noninventive polycarbonate polyols

| | | Example | | | | | | | | |
|---|---|---|---|---|---|---|---|---|---|---|
| | | A-1, inv. | A-2, inv. | A-3, inv. | A-4, inv. | A-5, inv. | A-6, comp. | A-7, comp. | A-8, comp. | A-9, comp. |
| Polytetrahydrofuran 2000 | [g] | — | — | 900 | 1814.0 | — | — | — | — | — |
| Diethylene glycol | [g] | 474 | — | — | — | 536.5 | — | — | 468.6 | — |
| Tetraethylene glycol | [g] | — | — | — | — | — | — | — | — | 434.4 |
| Distilled phenol, exp | [g] | 3848 | 3826 | 3637 | 2660 | 3777 | — | — | 2517 | 2226 |
| Distilled phenol, theoret | [g] | 3850 | 3829 | 3642 | 2660 | 3780 | 3699 | 3791 | 2515 | 2224 |
| Magnesium hydroxide carbonate | [mg] | 148 | 138 | 160 | 160 | 160 | 160 | 320 | 80 | 80 |
| Dibutyl phosphate | [mg] | 866 | 807 | 937 | 933 | 933 | — | — | 468 | 468 |
| Calculated properties: | | | | | | | | | | |
| Carbonate groups per kg of product | [mol/kg] | 5.57 | 5.53 | 4.87 | 3.56 | 5.03 | — | — | 6.69 | 5.92 |
| Ether groups per kg of product | [mol/kg] | 3.39 | 2.15 | 3.58 | 6.27 | 4.56 | — | — | 2.21 | 3.36 |
| Molar ratio of carbonate/ether groups | [mol/kg/mol/kg]] | 1.64 | 2.57 | 1.36 | 0.57 | 1.10 | — | — | 3.03 | 1.76 |
| Properties: | | | | | | | | | | |
| OH number of precursor (exp.) | [mgKOH/g] | 46.3 | 34.8 | 44.7 | 55.2 | 37.6 | — | — | — | — |
| OH number of end product (exp.) | [mgKOH/g] | 57.8 | 54.8 | 55.8 | 50.0 | 52.0 | — | — | 48.4 | 52.9 |
| Viscosity at 75° C. | [mPa*s] | 2200 | 2130 | 1680 | 2600 | 2540 | — | — | 4480 | 2210 |
| DSC max. | [° C.] | 33 | 47 | 47 | 43 | 15 | — | — | amorphous | 33 |
| Phenoxy end groups | [% by wt.] | 0 | 0 | 0 | 0 | 0 | — | — | 0.044 | 0.033 |
| Phenol | [% by wt.] | 0 | 0 | 0 | 0.02 | 0 | — | — | 0.011 | 0.085 |
| Phenyl carbonate end groups | [% by wt.] | 0.07 | 0.21 | 0.22 | 0 | 0.09 | — | — | 0.017 | 0 |
| Mode | | 2-stage | 2-stage | 2-stage | 2-stage | 2-stage | 1-stage termination | 1-stage termination | 1-stage | 1-stage |

4.) Synthesis of NCO Prepolymers

The NCO prepolymers were synthesized by reacting the polycarbonate polyols of examples A-1 to A-5 and A-8 to A-10 from table 1 with Desmodur 0118T:

Example B-1 (Inventive)

A 6 l three-neck flask equipped with a heating jacket, stirring mechanism and an internal thermometer was charged with 1850 g (7.4 mol) of Desmodur 0118T under nitrogen blanketing of 50° C. with stirring. Then 3001 g of a polycarbonate polyol from example A-1, preheated to 80° C., were added with stirring over the course of around 10 minutes. Stirring then continued under nitrogen at 80° C. The reaction was at an end after 2 hours. The NCO content was 10.04 wt % and the viscosity was 1760 mPas (at 75° C.).

TABLE 2

Formulations and analytical data of the MDI-based NCO prepolymers; the initial masses are evident from the hydroxyl numbers of the polyols and from the NCO content of the Desmodur 0118T.

| | | Example: | | | | | | |
|---|---|---|---|---|---|---|---|---|
| Polyol from example | Prepolymer Initial mass | B-1 inv. | B-2 inv. | B-3 inv. | B-4 inv. | B-5 inv. | B-8 (C) | B-9 (C) |
| A-1, inv. | [g] | X | — | — | — | — | — | — |
| A-2, inv. | [g] | — | X | — | — | — | — | — |
| A-3, inv. | [g] | — | — | X | — | — | — | — |
| A-4, inv. | [g] | — | — | — | X | — | — | — |
| A-5, inv. | [g] | — | — | — | — | X | — | — |
| A-8, comp. | [g] | — | — | — | — | — | X | — |
| A-9, comp. | [g] | — | — | — | — | — | — | X |
| Baytec C2208 | [g] | — | — | — | — | — | — | — |
| Desmodur 118T | [g] | X | X | X | X | X | X | X |
| NCO content | [% by wt. of NCO] | 10.04 | 9.9 | 10 | 10.1 | 9.9 | 10.0 | 9.98 |
| Viscosity, 75° C. | [mPas] | 1760 | 2010 | 1890 | 2230 | 2020 | 4480 | 2210 |

5.) Production of Casting Elastomers Based on 4,4′-Diphenylmethane Diisocyanate (MDI)

Example C-1, Inventive 100 parts of a prepolymer (from example B-1), preheated to 70° C. and degassed, were stirred together with 10.15 parts of 1,4-butanediol for 30 seconds. The reacting melt was cast into metal molds, which were at a temperature of 115° C., and a temperature of 110° C. was maintained for 24 hours. After 21 days of storage at room temperature, the mechanical data were determined (table 3). All quantity figures are weight figures.

The inventive examples C-2 to C-5 and the comparative examples C-8 to C-9(C) were produced as described in example C-1 above.

TABLE 3

Production and properties of polyurethane and polyurethaneurea elastomers C-1 to C-9 (C) by reaction of the MDI prepolymers (B-1 to B-10 (Q)) with butanediol; the parts by weight of MDI prepolymer and butanediol are evident from the NCO content of the prepolymer and from the specified index.

| | | | C-1 inv. B-1 inv. | C-2 inv. B-2 inv. | C-3 inv. B-3 inv. | C-4 inv. B-4 inv. | C-5 inv. B-5 inv. | C-8 (C) B-8 (C) | C-9 (C) B-9 (C) |
|---|---|---|---|---|---|---|---|---|---|
| | Prepolymer | | | | | | | | |
| Formulation: | MDI prepolymer | [parts] | X | X | X | X | X | X | X |
| | NCO content of prep. | [%] | 10.04 | 9.9 | 10 | 10.1 | 9.9 | 10.0 | 9.98 |
| | Viscosity (70° C.) | [mPas] | 2750 | 3085 | 2965 | 2970 | 2965 | 4330 | 2810 |
| | Butanediol | [parts] | X | X | X | X | X | X | X |
| | Index | | 103 | 103 | 103 | 103 | 103 | 103 | 103 |
| Processing: | Prepolymer temperature | [° C.] | 70 | 70 | 70 | 70 | 70 | 70 | 70 |
| | Casting time | [s] | 250 | 260 | 250 | 220 | 250 | 180 | 180 |
| | Demolding time | [min] | — | — | — | — | — | 60 | 60 |
| Mechanical properties: | Shore A | | 97A | 95.5A | 96A | 97A | 95.5 | 98A | 98A |
| | Shore D | | 53D | 47D | 48D | 53D | 47D | 55D | 58D |
| | 100% modulus | [MPa] | 15.7 | 15.7 | 14.5 | 13.3 | 13.2 | 18.3 | 16.2 |
| | 300% modulus | [MPa] | 32.4 | 41.6 | 33.9 | 26 | 32 | 30.3 | 34 |
| | Stress at yield | [MPa] | 52 | 57 | 47 | 54 | 52 | 49 | 44 |
| | Elongation at break | [%] | 410 | 382 | 391 | 474 | 417 | 414 | 400 |
| | Tear strength, without notching | [kN/m] | 159 | 151 | 149 | 152 | 152 | 176 | 163 |
| | Tear strength, with notching | [kN/m] | 112 | 82 | 82 | 101 | 69 | 124 | 104 |
| | Rebound resilience | [%] | 42 | 42 | 42 | 48 | 43 | 41 | 45 |
| | Abrasion | [mm³] | 65 | 65 | 55 | 50 | 45 | 66 | 89 |
| | Density | [g/mm³] | 1.19 | 1.18 | 1.17 | 1.16 | 1.19 | 1.16 | 1.16 |
| | CS 22 h 70° C. | [%] | 52 | 43 | 46 | 47 | 46 | 36 | 34 |
| | Glass transition temperature, DMA | [° C.] | −9.0 | −13.9 | −13.4 | not determined | −12.1 | 5.8 | −2.7 |

Table 3 shows that the inventive casting elastomers C-1 to C-5 readily achieve the given level of values in relation to the stress-strain characteristics, illustrated by the noninventive examples C-8(C) to C-10(C). The same is also true of the tear strengths, the abrasion behavior, and also, with some small deductions, of the compression set as well (CS). The inventive casting elastomers here, however, exhibit lower glass transition temperatures and accordingly display advantageous low-temperature characteristics.

The invention claimed is:

1. A polycarbonate polyol having an OH number of 40 to 80 mg KOH/g according to DIN 53240-1 of June 2013 (without catalyst) and a mean functionality of 1.9 to 2.2, comprising the reaction product of
A) at least one a,w-alkanediol having 4 to 8 carbon atoms,
B) at least one polytetrahydrofuran, and
C) diethylene glycol with at least one
D) carbonyl component selected from the group consisting of diaryl carbonates, dialkyl carbonates, cyclic alkylene carbonates and $COCl_2$, and mixtures thereof.

2. The polycarbonate polyol as claimed in claim 1, wherein the at least one α, ω-alkanediol having 4 to 8 carbon atoms (A) is selected from the group consisting of 1,4-butanediol, 2-methylpropane-1,3-diol, 1,5-pentanediol, 3-methylpentane-1,5-diol, 1,6-hexanediol and 1,8-octanediol, and mixtures thereof.

3. The polycarbonate polyol as claimed in claim 1, wherein the at least one polytetrahydrofuran (B) has number-average molecular weights in the range from 250 to 2900 Da.

4. The polycarbonate polyol as claimed in claim 1, wherein the molar ratio of carbonate groups to ether groups is in the range from 0.2:1 to 3.5:1.

5. The polycarbonate polyol as claimed in claim 1, wherein for a sample stored for more than four weeks at room temperature, a maximum in a melting endotherm determined by DSC according to DIN EN ISO 11357-1 from March 2010 at a heating rate of 10° C/min is in the range from 9 to 59 20 C.

6. A process for preparing a polycarbonate polyol as claimed in claim 1, wherein a two-stage process is employed, wherein in a first stage, in the presence of a catalyst, an intermediate is prepared from
A) at least one α, ω-alkanediol having 4 to 8 carbon atoms,
C) diethylene glycol, and
D) at least one carbonyl component from the group consisting of diaryl carbonates, dialkyl carbonates, alkylene carbonates and $COCl_2$, and mixtures thereof, and in a second stage this intermediate is reacted with
B) at least one polytetrahydrofuran.

7. The process as claimed in claim 6, wherein in the second stage, in addition to the
- B) at least one polytetrahydrofuran, for compensating the diols A) and/or C) partially removed in the first stage,
- A) at least one a, w-alkanediol having 4 to 8 carbon atoms and/or
- C) diethylene glycol are/is added.

8. The process as claimed in claim 6, wherein in the first stage, the components A) and/or C) are used in excess in an amount which produces a deviation of 2 to 20 hydroxyl number units relative to the actual target hydroxyl number.

9. An NCO prepolymer based on the polycarbonate polyol as claimed in claim 1.

10. The NCO prepolymer as claimed in claim 9, having an NCO content of 3 to 15 wt %, obtained by reacting a polycarbonate polyol as claimed in claim 1 with at least one polyisocyanate from the group consisting of 1,5-naphthalene diisocyanate, 2,4'-diphenylmethane diisocyanate (2,4'-MDI), 4,4'-diphenylmethane diisocyanate (4,4'-MDI), mixtures of 2,4'- and 4,4'-MDI, carbodiimide/uretonimine-modified MDI derivatives and higher polycyclic homologs of the diphenylmethane series, diisocyanatotoluenes, hexamethylene diisocyanate, isophorone diisocyanate, and mixtures thereof in a molar excess.

11. A polyurethane elastomer or polyurethaneurea elastomer based on an NCO prepolymer as claimed in claim 9.

12. A method comprising providing the polyurethane elastomer or polyurethaneurea elastomer as claimed in claim 11 for producing technical components.

13. A method of preparing a roll coating material or shoe press blankets, as pigs, pig disks, seals, pipe coatings, stiffening elements for pipes or cables, conveyor belts or screens, doctor blades, wheels, rollers, or potting compound, the method comprising providing the polyurethane elastomer or polyurethaneurea elastomer as claimed in claim 11.

14. A technical component, roll coating, shoe press blanket, electrical casting, pig, pig disk, seal, pipe coating, stiffening element for pipes or cables, doctor blade, wheel, roller, conveyor belt or screen comprising a polyurethane elastomer or polyurethaneurea elastomer as claimed in claim 11.

15. A polyurethane elastomer or polyurethaneurea elastomer obtained by reacting an NCO prepolymer as claimed in claim 9 with
- (i) at least one aliphatic diol having primary hydroxyl groups and a number-average molecular weight of 62 to 202 and in amounts of 0-10 wt %, based on the at least one aliphatic diol, compounds from the group consisting of short-chain polyols having functionalities >2 to 4, polyols of higher molecular weight having a functionality of 2, and polycarbonate polyols as claimed in claim 1, optionally in the presence of water, and optionally further auxiliaries and adjuvants, and/or
- (ii) at least one aromatic diaminic chain extender selected from the group consisting of 4,4'-methylenebis(2-chloro aniline) (MB OCA), 3,3',5,5'-tetraisopropyl-4, 4'-diaminodiphenylmethane, 3,5-dimethyl-3 ',5'-diisopropyl-4,4'-diaminophenylmethane, 3,5-diethyl-2,4-tolylenediamine, 3,5-diethyl-2,6-tolylenediamine (DETDA), 4,4 -methylenebis(3-chloro-2,6-diethylaniline), 3,5-dimethylthio-2,4-tolylenediamine, 3,5-dimethylthio-2,6-tolylenediamine, isobutyl 3,5-diamino-4-chlorobenzoate, and mixtures thereof, optionally in the presence of water, and optionally further auxiliaries and adjuvants.

* * * * *